Dec. 9, 1969 HIROSHI INOSE ET AL 3,483,330
NETWORK SYNCHRONIZATION IN A TIME DIVISION SWITCHING SYSTEM
Filed Dec. 22, 1966 15 Sheets-Sheet 1

INVENTORS H. INOSE
H. FUJISAKI
T. SAITO
BY R. C. Winter
ATTORNEY

NETWORK SYNCHRONIZATION IN A TIME DIVISION SWITCHING SYSTEM

Filed Dec. 22, 1966 15 Sheets-Sheet 2

Dec. 9, 1969 HIROSHI INOSE ET AL 3,483,330

NETWORK SYNCHRONIZATION IN A TIME DIVISION SWITCHING SYSTEM

Filed Dec. 22, 1966 15 Sheets-Sheet 3

FIG. 10 JITTER ELIMINATOR 41

BIT SHIFTER 44

NETWORK SYNCHRONIZATION IN A TIME DIVISION SWITCHING SYSTEM

Filed Dec. 22, 1966 15 Sheets-Sheet 11

FIG. 14 JITTER CONTROL 43

NETWORK SYNCHRONIZATION IN A TIME DIVISION SWITCHING SYSTEM

Filed Dec. 22, 1966

BIT SHIFTER MEMORY CONTROL 46

United States Patent Office 3,483,330
Patented Dec. 9, 1969

3,483,330
NETWORK SYNCHRONIZATION IN A TIME DIVISION SWITCHING SYSTEM

Hiroshi Inose, Hiroya Fujisaki, and Tadao Saito, Tokyo, Japan, assignors to Bell Telephone Laboratories, Incorporated, Murray Hill, N.J., a corporation of New York Filed Dec. 22, 1966, Ser. No. 603,892
Claims priority, application Japan, May 11, 1966, 41/29,362
Int. Cl. H04j *3/00, 3/06;* H04m *3/00*
U.S. Cl. 179—15 11 Claims

ABSTRACT OF THE DISCLOSURE

Apparatus is disclosed for synchronizing operations in a multicenter communication system in which synchronizing signals received from other centers are compared individually with a locally generated synchronizing signal, and the sum of the resultant error signals is used to adjust the frequency of the locally generated synchronizing signal.

This invention relates to the synchronization of operations performed in various locations remote from one another as required, for example, in a communication system having switching centers interconnected on a time division multiplex basis.

The timing control problem in such a system may be solved by designating a particular center as the master clock source for the timing of operations throughout the system. Slave clocks in each of the other centers which direct the timing control only in the corresponding center are constrained to have the same timing frequency as that originating at the master center. This master-slave relationship for timing control has several disadvantages arising primarily from the varying transmission characteristics between the master control center and each of the slave control centers. Also of primary concern in a communication system which cannot afford long out-of-service intervals, a device failure occurring in the master timing control or in one or more of the transmission links between the master center and the slave centers may be catastrophic. Apparatus required to safeguard against or correct for such a failure is exceedingly complex and not completely fail safe regardless of the precautions taken.

An alternate approach which has proven feasible is designated as mutal synchronization. This approach abandons the master-slave or autocratic relationship in favor of a democratic approach in which each switching center of the network influences the timing of the entire network as much as any of the others but no more. Thus the frequency of the timing wave originating at a particular switching center has a like influence on the frequencies of timing waves originating at each of the other switching centers in determining the ultimate frequency of the timing wave that synchronizes the entire network. An arrangement of this kind is described in J. P. Runyon Patent 3,050,586 issued Aug. 21, 1962.

According to the Runyon arrangement, timing synchronization signals received in a particular switching center from a plurality of other switching centers are directed through a phase averaging circuit, the resultant being compared with the phase of the output of the local clock. The resultant of this comparison is then used to retune the local oscillator, which in turn controls all of the local center timing operations and in addition controls delays introduced into the several incoming paths to assure that information is received in the appropriate preassigned time intervals.

It is an object of this invention to provide improved and simplified timing controls for the switching centers of a time division multiplex system operating on a mutual synchronization basis.

The present invention solves the problem of system synchronization by making concurrent adjustments in each office for the various factors which can lead to a loss of synchronization between incoming signals and locally generated timing signals without a concomitant requirement for complex timing control devices. Thus precise synchronization is assured, and the likelihood of a failure in any device affecting the overall system operation is remote.

Timing is established on a bit and frame basis. Each switching center clock is capable of defining a plurality of time slots in a repetitive cycle, each binary digit or bit of information being transmitted in a corresponding assigned time slot which appears in each successive cycle of time slots or frame.

Each bit pulse train occupying succesive time slots in a frame should be received by a switching center in phase with the bit timing and frame timing of that switching center. To accomplish this the local clock frequency, as well as the phase, of each switching center, should be synchronized. Frequency synchronization is attained by the mutual interaction of multiple input phase-locked oscillators provided at each office as the clock source, and phase synchronization is accomplished by the adjustment of the signal transmission delay at the receiving end of each transmission line between switching centers.

For frequency synchronization, the frame rate is adopted as the system frequency and the transmission delay between centers is adjusted to be roughly equal to an integral multiple of the frame length. For this purpose fixed delay lines are provided at the receiving end of each transmission line. Timing signals received at the frame rate are directed to a detector circuit which in turn transmits the detected frame timing signal to a phase comparator circuit, one such phase comparator being provided for each incoming transmission line. The phase of the local clock frame timing signal is compared with the signal received in each of the phase comparator circuits and the summation of the resultant error signals from all of the phase comparators in the local switching center is utilized to control the frequency of the local clock oscillator.

The output of the oscillator is counted down to provide the specific bit and frame timing signals for control of local center operations. A reverse phase frame timing pulse obtained from the countdown device is fed back to each of the phase comparators, thus forming a phase-locked loop of the type described by C. J. Byrne in an article entitled "Properties and Design of the Phase-Controlled Oscillator With a Sawtooth Comparator" in the March 1962 issue of The Bell System Technical Journal, vol. XLI, No. 2, at p. 559.

The frequency synchronization arrangement, including the fixed delay at the receiving end of each transmission line, is sufficient to control the frame timing at each switching center. However, it will not assure receipt of each bit in the precise, desired position of a corresponding assigned time slot. For this purpose a separate phase synchronization unit comprising a variable delay is provided at the receiving end of each transmission line. If several transmission lines are involved in the connection between two switching centers, only one line is connected to the frequency synchronization arrangement. The phase of the signal received from the variable delay is compared with the frame timing signal generated within the local office and the variable delay is then controlled to shift the pulse so as to be exactly in phase with the local clock.

A third portion of the mutual synchronization arrangement is concerned with the fact that the particular phase comparison error summing arrangement to provide frequency synchronization will not assure exact phase synchronism throughout the system. There is a possibility that distinct phase differences of relatively large magnitude will not only be left undetected but will, in fact, be maintained. In accordance with our invention such out-of-phase modes, in which the oscillation phases of the switching centers do not assume an identical value, are corrected by the provision of a phase mode selector which detects the phase mode of the incoming frame timing signal from another switching center and adjusts the phase mode of the local switching center accordingly.

Thus, the output of the local oscillator, which is adjusted by timing signals received at the frame rate from other switching centers to be of the proper system frequency and phase mode, is counted down to provide bit timing used for phase adjustment of the incoming signals.

It is a feature of this invention that frequency synchronization is achieved by comparison of the frame timing signal generated at the local switching center with frame timing signals received from each of the other switching centers and by the summation of the comparison resultants to provide an error signal which is utlized to correct the phase of the local clock oscillator.

It is another feature of this invention that bit phase synchronization is achieved by comparison of the incoming bit phase with the frequency corrected output of the local clock oscillator.

It is another feature of this invention that distinct phase comparators for frequency synchronization and phase comparators for bit phase synchronization are provided at each switching center to assure that proper frequency and bit phase are attained concurrently in each switching center.

It is yet another feature of this invention that the transmission delay between switching centers is adjusted to be roughly an integral multiple of the frame period so as to prevent system frequency jumps due to system parameter viriations.

It is still another feature of this invention that a phase mode selector circuit is provided to assure that the identical phase mode prevails in all switching centers, should a radical system frequency jump occur.

A complete understanding of these and other features of the invention may be gained from consideration of the following detailed description, together with the accompanying drawing, in which.

Figure 1:
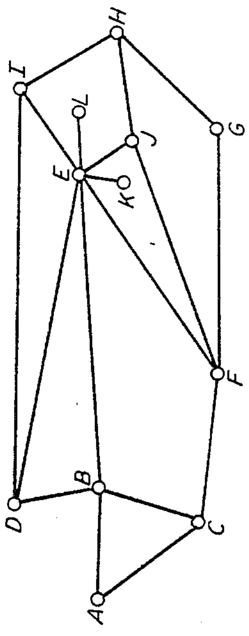
FIG. 1 is a schematic representation of a network of interlinked time division switching centers in which the arrangement in accordance with this invention may be employed.

Referring now to the drawing, FIG. 1 illustrates a system comprising a network of switching centers in which the illustrative embodiment of this invention may be utilized. Each switching center is represented by a small circle and a letter designation. Each of the centers is connected with at least one of the other centers via a two-way communication link represented in FIG. 1 by a single straight line. It is contemplated that in practice the network may be many times as large as that shown and may encompass hundreds or even thousands of switching centers.

The network is composed of a number of closed loops in the form of triangles, with a switching center at the node of each angle. An illustrative one of these triangles in the left-hand portion of the figures is that composed of the nodes A, B and C, in which node A is linked with nodes B and C, node B is linked with nodes A and C, and node C is linked with nodes A and B, each link being a two-way communication path.

In FIG. 1, as generally in practice, each switching center is also linked to one or more other siwtching centers. Thus node C is also linked to node F, while node B is also linked to node D and to node E. Our invention will be considered in terms of such a triangular arrangement of switching centers as an illustration.

Figure 2:
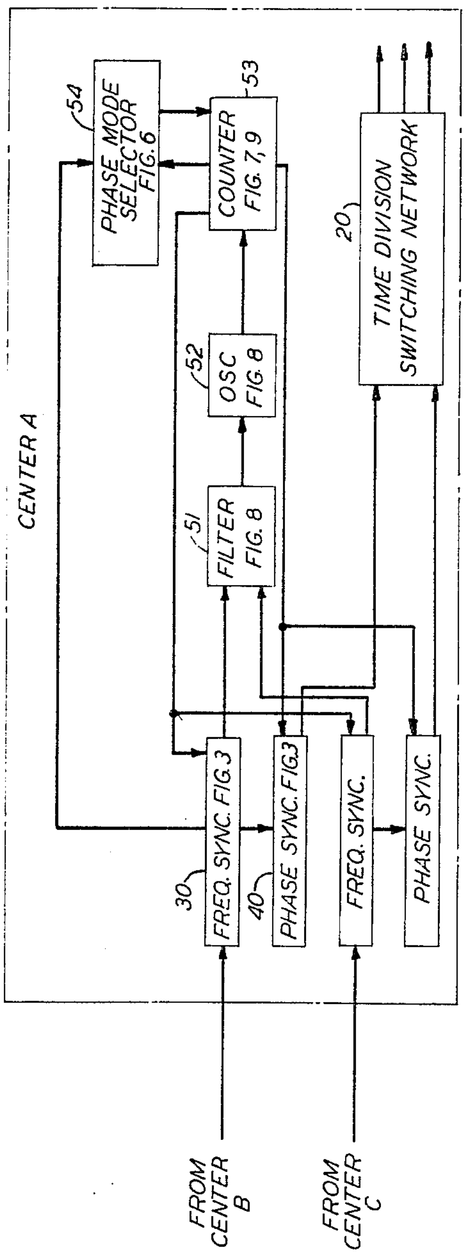
FIG. 2 is a schematic representation in block diagram form of the mutual synchronization equipment provided in each of the switching centers in the system.

Referring now to FIG. 2, the particular components pertinent to the operation of our mutual synchronization arrangement, as contained in each of the switching centers, are illustrated. In this instance the switching center at node A is illustrated such that transmission lines from switching centers B and C terminate in switching center A.

The purpose which the invention serves is to provide fully compatible timing controls to govern all of the switching and control operations at the several centers. The switching apparatus itself and the manner in which it operates is conventional and forms no part of the invention. Accordingly, all of this apparatus has been grouped together in a single block 20 designated Time Division Switching Network. It is to be understood that in practice this network includes all of the voice frequency lines incoming from and outgoing to individual stations located in the vicinity of the switching center as well as trunks incoming from and outgoing to all of the switching centers in the system with which the local center is linked.

Phase timing for this specific illustrative embodiment may, for example, have a nominal clock pulse rate of 1.544 megahertz and a frame rate of 8 kilohertz. This would conform to the timing chart set forth in FIG. 4, in which one frame is divided into twenty-four time slots $S_1$, $S_2$ . . . $S_{24}$, each of which contains eight bits designated $B_1$, $B_2$ . . . $B_8$, and a twenty-fifth time slot $S_s$ containing a single bit. The bit interval in turn is divided into four phases $\varphi_1$ . . . $\varphi_4$ each having a 160 nanosecond duration. Each incoming intelligence and timing signal bit is expected to occupy phases $\varphi_2$ and $\varphi_3$ of each bit interval. In this illustrative embodiment the frame timing pattern is eight bits of successive "1's" which occupy the first time slot $S_1$, preceded by a "0" in the last time slot $S_s$.

Signals incoming from each of the other switching centers are processed in a corresponding frequency synchronization circuit 30 and phase synchronization circuit 40, one of which is provided for each of the switching centers connected to center A. Equipment at center A which is common to all of the switching centers with which it is connected comprises filter 51, local oscillator 52, counter 53 and phase mode selector 54.

The operation of the mutual synchronization scheme in accordance with his embodiment will be described in terms of intelligence and timing signals received from switching center B. Such information is received in frequency synchronization circuit 30 at a fixed frame rate delay 31, FIG. 3, which adjusts the total delay from center B to be roughly an integral multiple of one frame length. The output of delay 31 is transmitted to frame detector 32 which extracts each frame timing pattern from the input signal train. Bit extractor 33 detects each bit in the incoming signal train as received at the input of delay 31. Timing signals are then transmitted from the bit extractor 33 to the frame detector 32 to retime the incoming signal train.

The output of frame detector 32 is supplied to phase comparator 34 in which the detected frame timing pattern is compared with the locally generated frame timing pattern as provided by the local oscillator 52 through counter 53. The resultant phase error signal from phase comparator 34 is added to the error signals developed by the other phase comparators in switching center A upon application to filter 51, and their sum is utilized to adjust the frequency of local oscillator 52.

Figure 4:
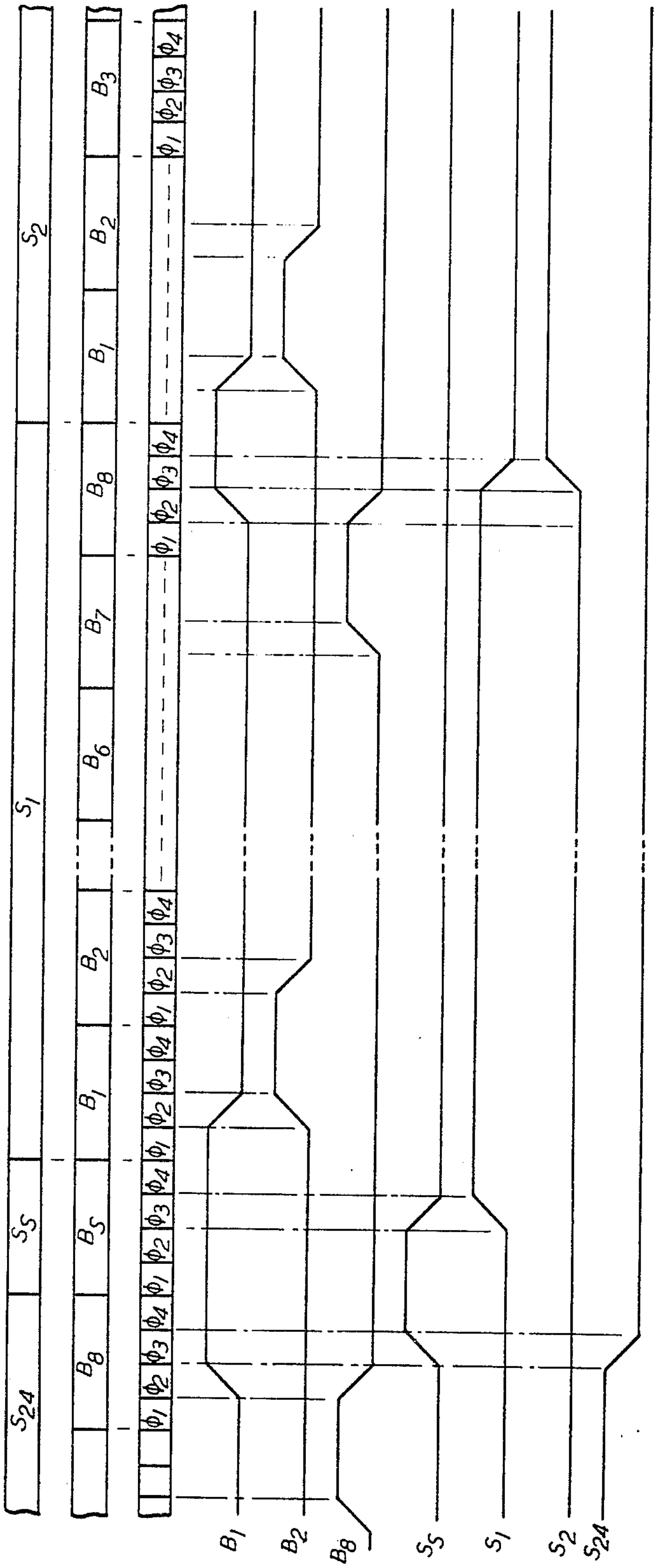
FIG. 4 is a representation of the timing signals utilized throughout the system.

Counter 53 accepts signals from oscillator 52 and, in turn, provides signals corresponding to each phase, time slot and frame, as indicated in FIG. 4. The output of counter 53 is fed back to phase comparator 34 and to each of the other phase comparators in switching center A in order to close the phase-locked loop. Thus circuit 30 is operative to adjust the frequency of the local oscillator 52 in accordance with the phase of each frame timing pattern received from centers B and C.

It is possible, however, that centers in a mutually synchronized system utilizing the frequency correction arrangement just described may be pulled into synchronism with a large phase difference existing between them despite the fact that the natural frequency of each switching center is the same and the delay between centers is precisely adjusted. In the situation illustrated in FIG. 2, with a closed loop including three switching centers A, B and C, the centers may be in synchronism, with a 120° phase difference existing therebetween. The reason for the existence of such a phase difference will be clarified in the detailed description of the frequency synchronization arrangement. Phase mode selector 54 is provided in order to correct for the appearance of such an out-of-phase mode. It detects the presence of such modes by comparing a signal representing the incoming frame timing pattern, designated the frame marker, as received from frame detector 32 with the locally generated frame marker as received from counter 53. If a large phase difference is detected by selector 54, the phase of the local center is adjusted so as to coincide with the phase of the incoming signal from center B.

Figure 3:
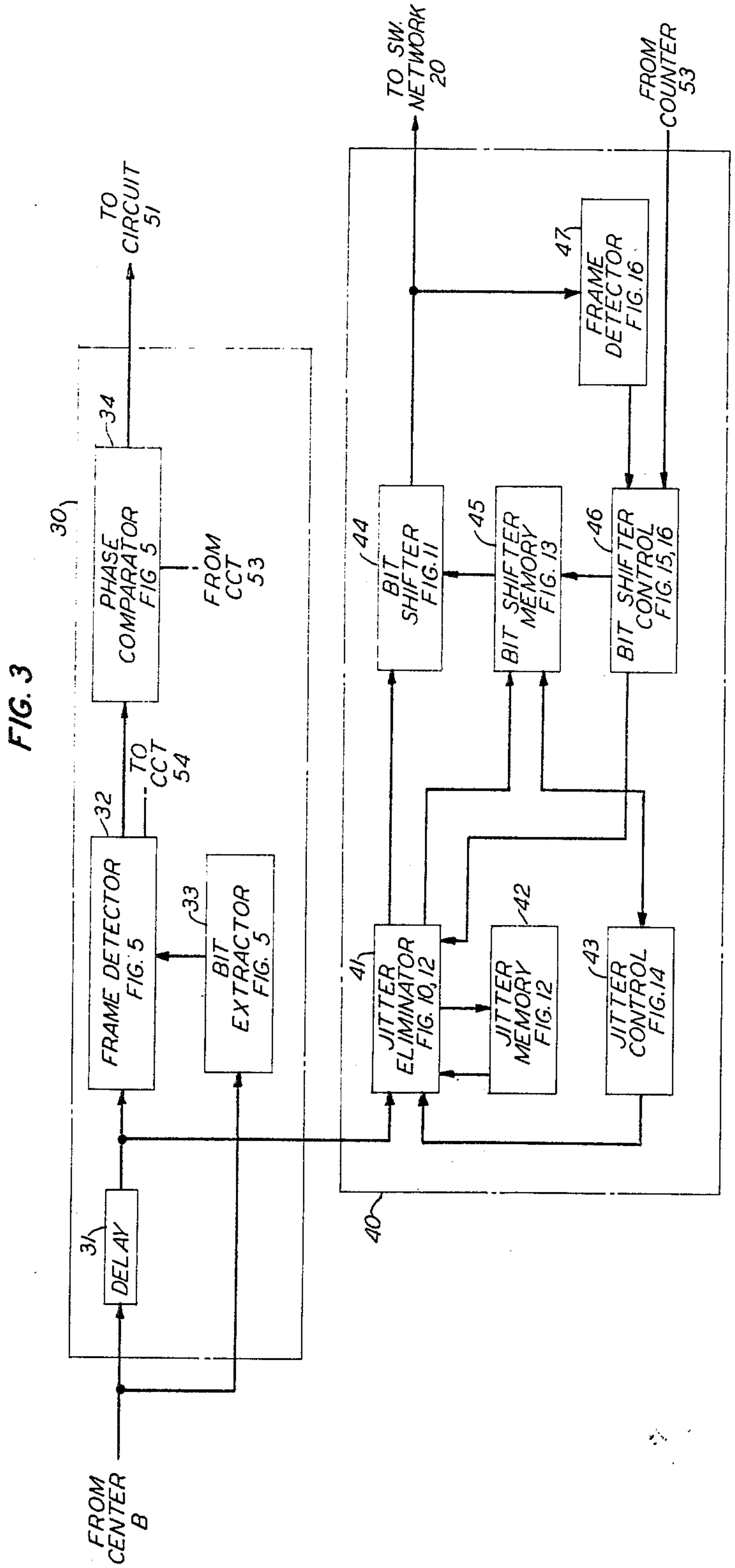
FIG. 3 is a schematic representation in greater detail of the frequency and phase synchronization portions of the equipment depicted in FIG. 2.

The system for synchronizing the phase of each incoming signal includes the elements depicted in block 40, FIG. 3, which are acted upon by the output of delay 31 and counter 53 to produce a properly phased signal pulse train for delivery to the time division switching network 20. A shift in phase of a single bit in the incoming pulse train is corrected by elements including jitter eliminator 41, memory 42 and jitter control circuit 43. The combination of these elements serves to suppress such position shifts, termed phase jitter, encountered within a single bit interval in the incoming pulse train.

The phase synchronizer 40 also includes a circuit comprising bit shifter 44, memory 45 and control 46. This circuitry achieves the proper bit phase by comparing the individual bits in the incoming frame timing pattern with the frame timing established within switching center A. For this purpose a frame detector circuit 47 detects the incoming frame timing pattern bits and transmits them to the bit shifter memory control 46 to modify the information stored in bit shifter memory 45. If phase jitter larger than a bit width is detected, jitter eliminator 41 also sends a signal to bit shifter memory 45 to realize the desired compensation. The output of bit shifter 44. now exactly in phase with timing signals generated locally, is transmitted to the local time division switching network 20.

FREQUENCY SYNCHRONIZATION—FIG. 5

Figure 5:
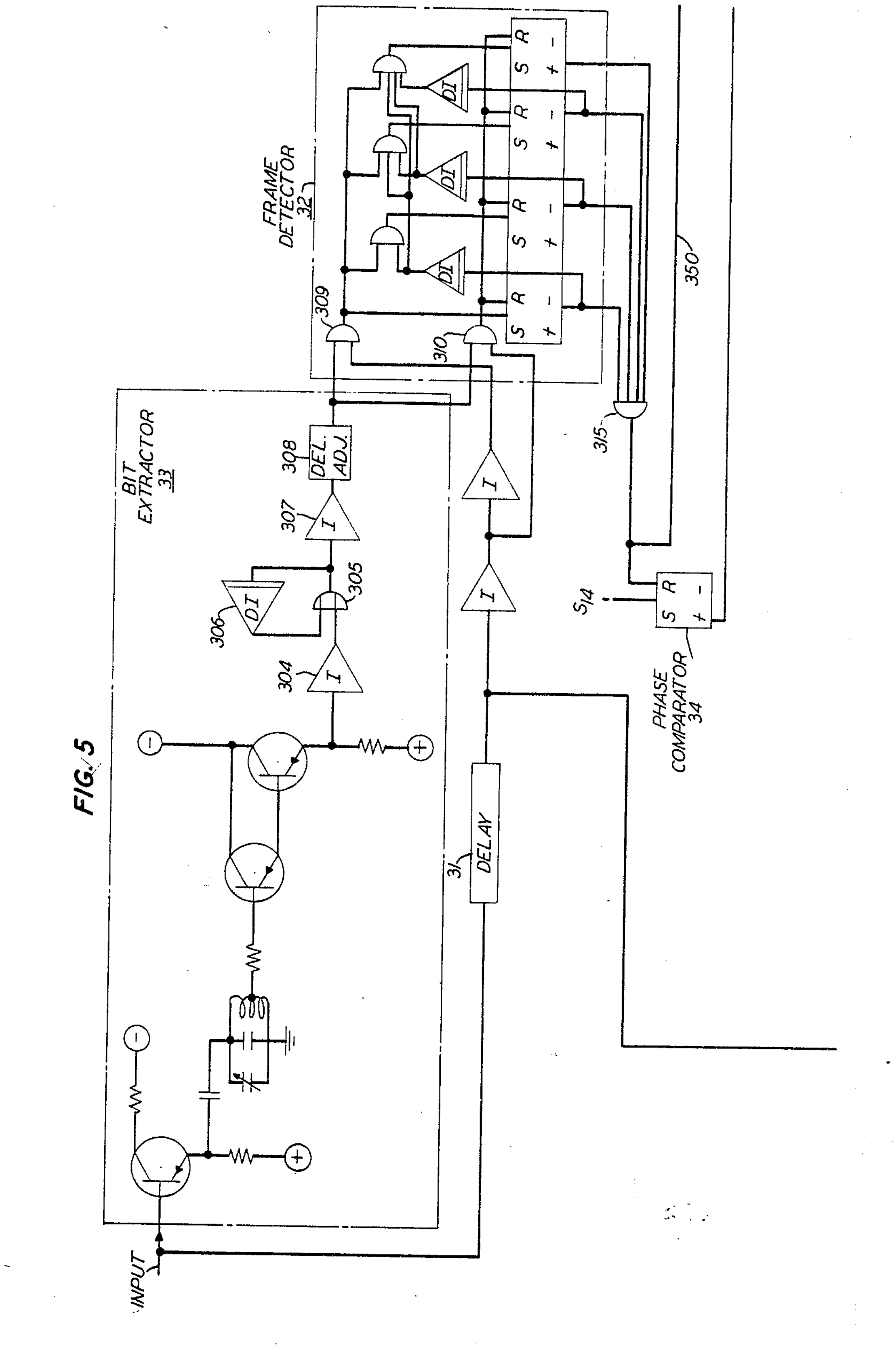
FIGS. 5 through 16 are a detailed schematic representation of the apparatus components required in each of the switching centers for mutual synchronization of the system timing. The arrangement is shown in FIG. 17.

The bit rate is derived from the incoming pulse train by the bit extractor 33 which, as illustrated in FIG. 5, comprises a simple, single tuning circuit having at its output a current amplifier of the type disclosed in S. E. Darlington Patent 2,663,806. The amplifier output signal is inverted and then applied to a regenerative broadening circuit comprising OR gate 305, delay inverter 306 and inverter 307. The position of the reshaped bit pulse is adjusted in delay adjuster circuit 308 so as to occupy the entire phase $\varphi_2$ position in each bit interval.

The output of bit extractor 33 in its reshaped and repositioned form is applied to frame detector 32 together with the incoming signals received from delay 31. The binary "1" input signal will pass through AND gate 309, while the "0" signal will pass through AND gate 310.

Frame detector 32 consists of a four-stage parallel type counter which is reset whenever a "0" signal is received from the incoming pulse train. Thus the counter can only provide an output signal through AND gate 315 when it has reached a count of eight (1000) signifying the eight successive "1's" have been received. As indicated heretofore, eight successive "1's" in the incoming pulse train signifies receipt of the frame timing pattern. Thus an output pulse from AND gate 315 is the frame marker or demarcation between successive frames of the incoming pulse train.

The detected frame marker is applied to phase comparator 34 which comprises a simple flip-flop circuit having as its control input a pulse in time slot 14 ($S_{14}$), bit position 1 ($B_1$) and phase 4 ($\varphi_4$). The frame marker from AND gate 315 normally is applied to the reset side of the flip-flop in phase comparator 34 in $S_1B_8\varphi_2$ of each frame. Thus phase comparator 34 compares the frame marker of the incoming pulse train with a locally generated frame marker which is 180 degrees out of phase with that of the incoming pulse train.

TIMING CONTROL LOOP—FIGS. 7–9

Figure 8:
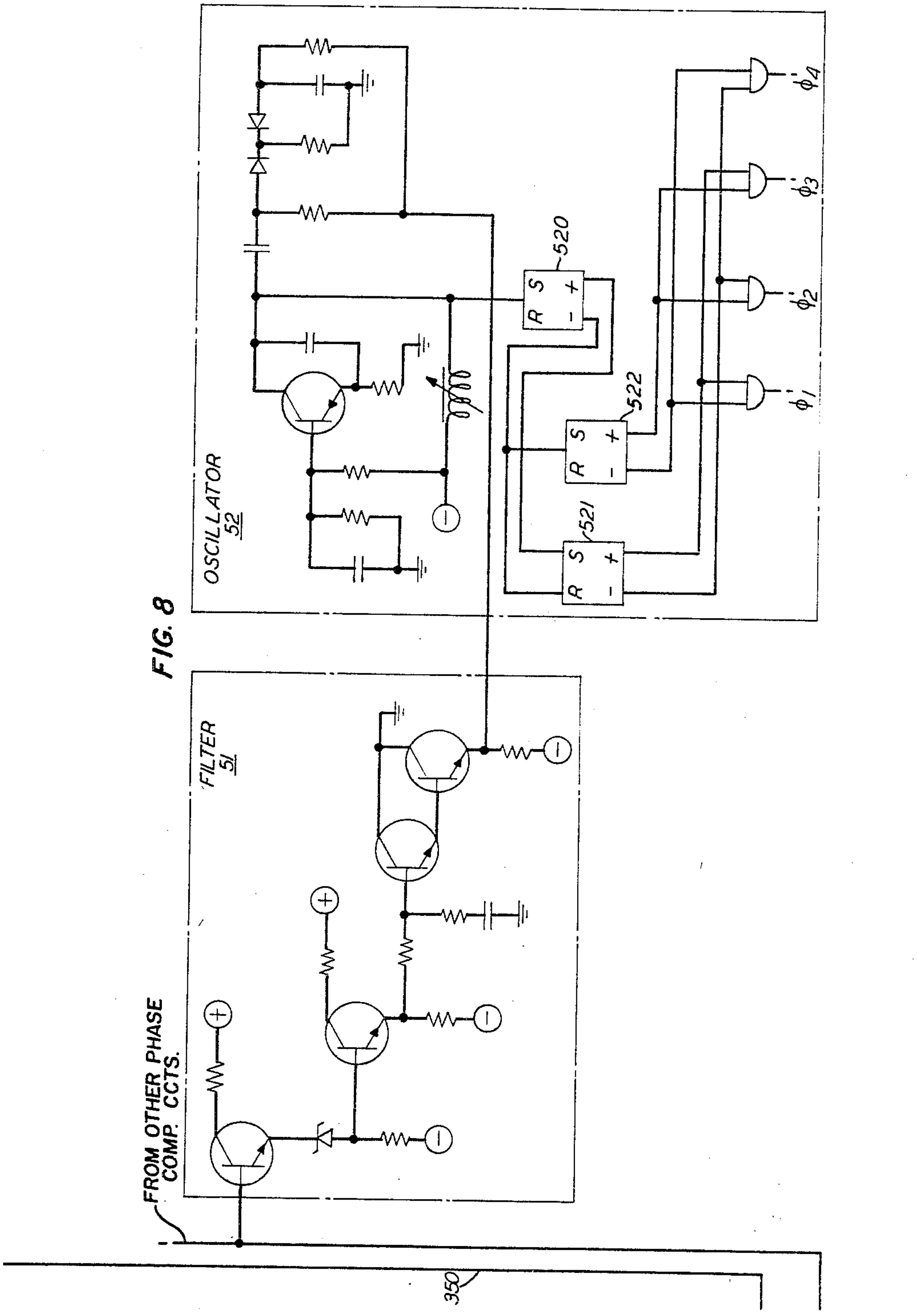

Any signal produced by phase comparator 34 of more or less than ½ frame duration constitutes an error in phase which is combined with the error signals produced by all of the other phase comparators in switching center A and transmitted through filter 51, FIG. 8, to adjust the dynamic characteristics of the phase-locked oscillator 52. Advantageously, the error signals may be weighted according to the corresponding signal sources in order to compensate for the distances between centers, et cetera.

Filter 51, which may be of the form indicated in FIG. 8, determines the transient response of the mutual synchronized system. It comprises a simple phase lag type RC filter which is designed to inhibit the application of excessive alternating current components to the voltage controlled oscillator 52 connected to its output.

The voltage control oscillator 52, as depicted in FIG. 8, is a sine wave generator with a nominal free oscillation freqeuency of 6.176 megahertz. In this illustrative embodiment a Colpitts type of oscillator is utilized to generate the system bit rate of 1.544 megahertz. The output of the oscillator is applied to flip-flop 520 which controls a two-stage counter consisting of flip-flops 521 and 522. The output of the counter is applied to four AND gates which serve to generate timing pulses in phases $\varphi_1$, $\varphi_2$, $\varphi_3$ and $\varphi_4$ respectively. Flip-flop 521 compensates for any delay encountered in flip-flop 522. These phase pulses in turn are amplified and applied to various components in the system as required.

Figure 7:
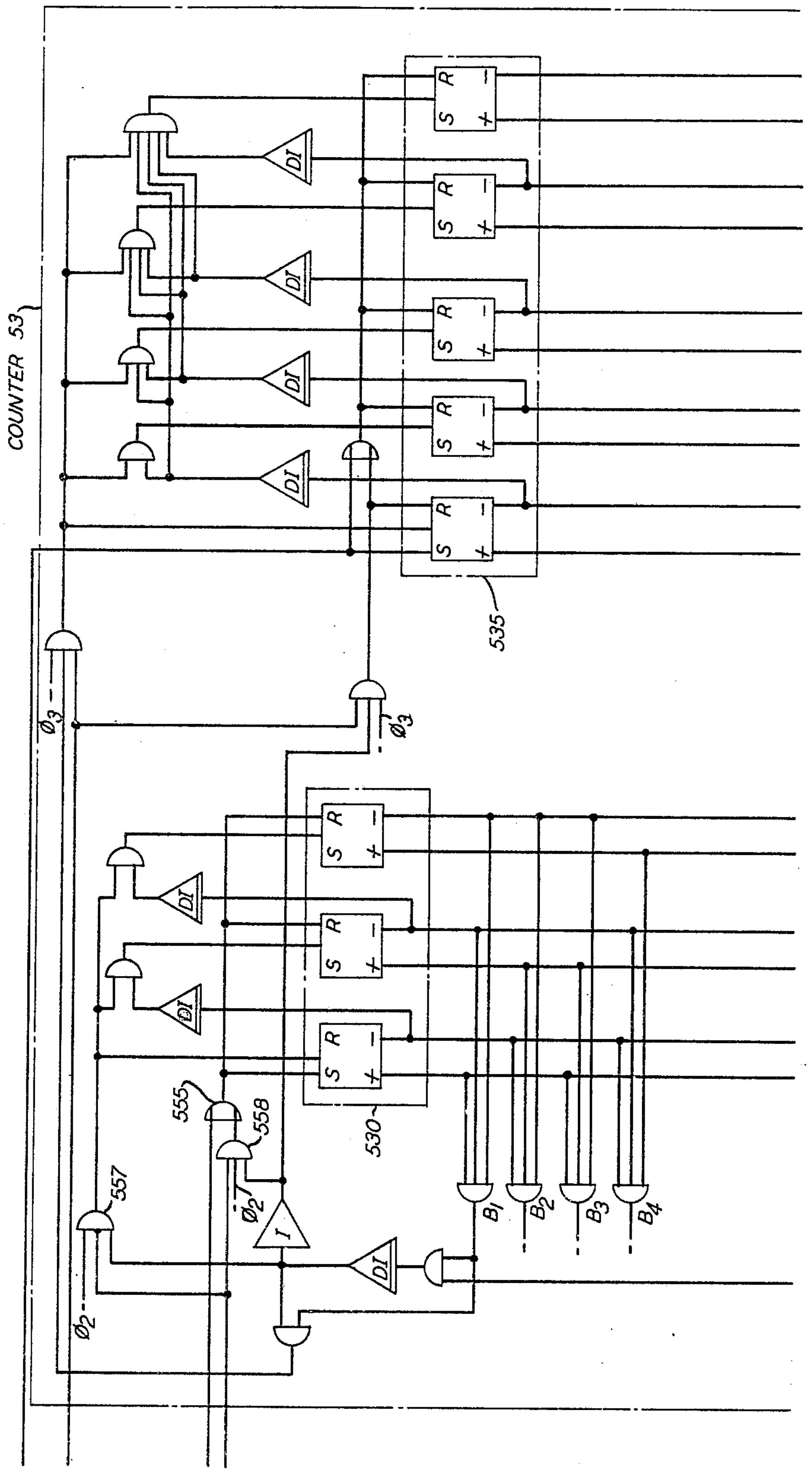
Figure 9:
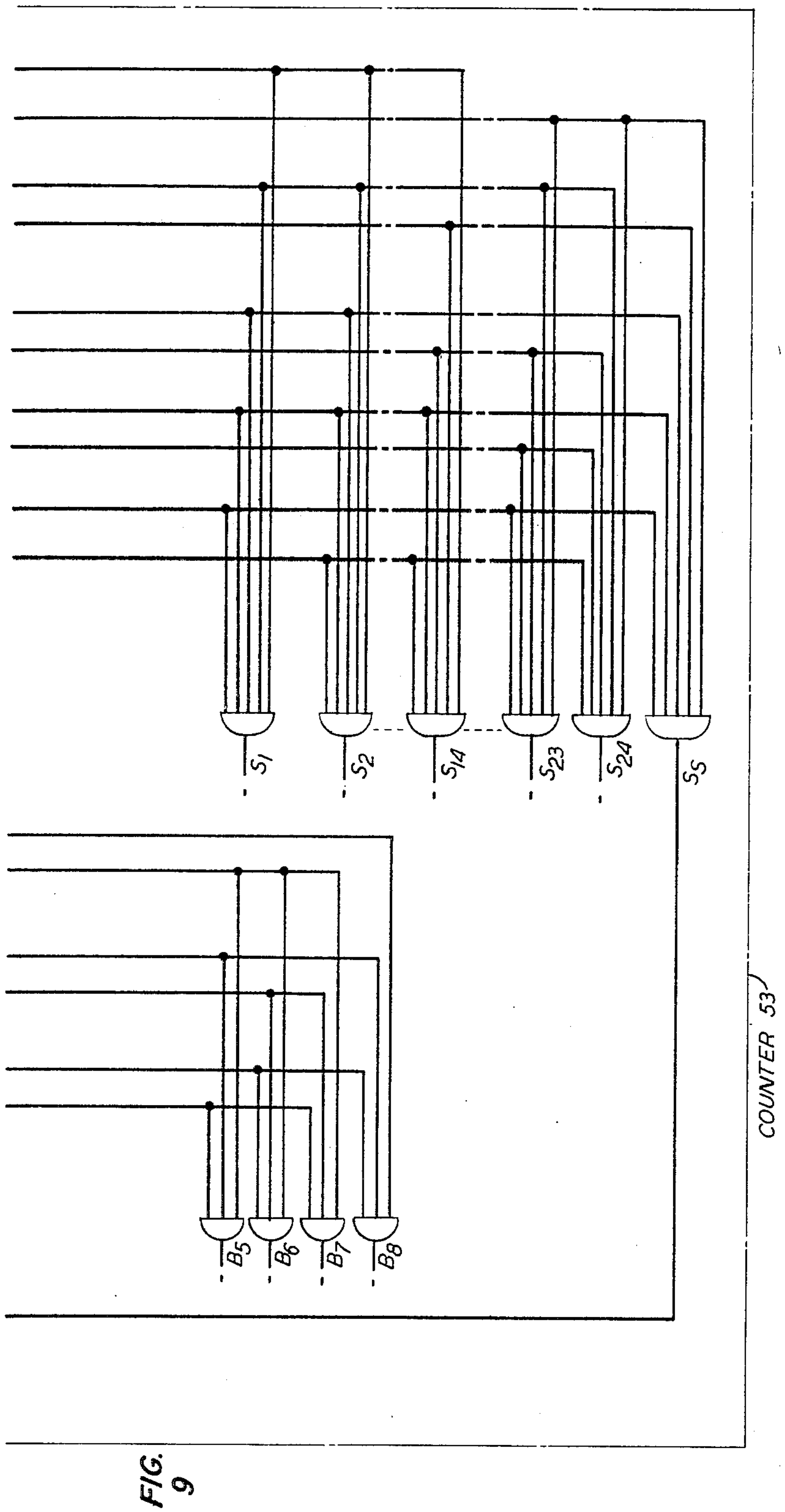

The bit and time slot counter 53, as illustrated in FIGS. 7 and 9, comprises a three-stage bit counter 530 and a five-stage time slot counter 535. The bit counter 530 is a parallel type driven by phase $\varphi_2$ pulses received from oscillator 52. The output of each stage in the bit counter is decoded in a plurality of AND gates to provide for each of the eight bit positions decoded $B_1 \ldots B_8$.

Time slit counter 535 is a parallel type five-stage counter which is incremented by pulses in $B_1\varphi_3$. Again the outputs of each stage are decided in AND gates to provide time slot codes having five digit binary codes for each time slot $S_1 \ldots S_{24}$, $S_s$. At $S_1B_1$ the inccrementing bit counter pulse is inhibited and bit counter 530 is reset to state $B_1$. Also in time slot counter 535 the gating arrangement is such that all stages are reset to the state of $S_1$ at this time, so that the framing period is reinitiated.

It may be noted in FIG. 7 that bit counter 530 is incremented in phase $\varphi_2$ and time slot counter 535 is incremented in phase $\varphi_3$. Thus the bit timing signal is initiated in phase $\varphi_2$ of the preceding bit position and is terminated in phase $\varphi_2$ of the bit position being defined. For example, the $B_2$ pulse FIG. 4 starts in $B_1\varphi_2$ and ends in $B_2\varphi_2$. Similarly, since time slot counter 535 is driven by the $B_1\varphi_3$ phase, the time slot pulse appears at $B_8\varphi_3$ of the preceding time slot and disappears in $B_8\varphi_3$ of the time slot being driven. For example, a time slot $S_2$ pulse appears at $S_1B_8\varphi_3$ and disappears in $S_2B_8\varphi_3$. Thus the phase signal fed back from counter 53 to phase comparator 34, FIG. 5, representing time slot $S_{14}$ in fact appears at $S_{13}B_8\varphi_3$.

PHASE MODE—FIG. 6

The switching centers in a system which is synchronized in accordance with this illustrative embodiment of our invention may, in fact, be pulled into synchronism with large phase differences still existing between the several centers despite the fact that the natural frequency at each center is identical and the delay between centers is precisely adjusted. Thus a closed network of three centers, such as centers A, B and C in FIG. 1, may be in synchronism while in fact a phase difference of 120 degrees exists between each pair of centers.

A phase mode selector in two of the three centers prevents such an occurrence. The phase of a first center is considered to be in the proper mode and phase mode selectors in the other two centers will assure that the corresponding centers exihibit the same phase as the first center. The phase mode selector, therefore, consists of a circuit which compares the phase mode of the corresponding center with that of the first center.

Figures 6, 17:
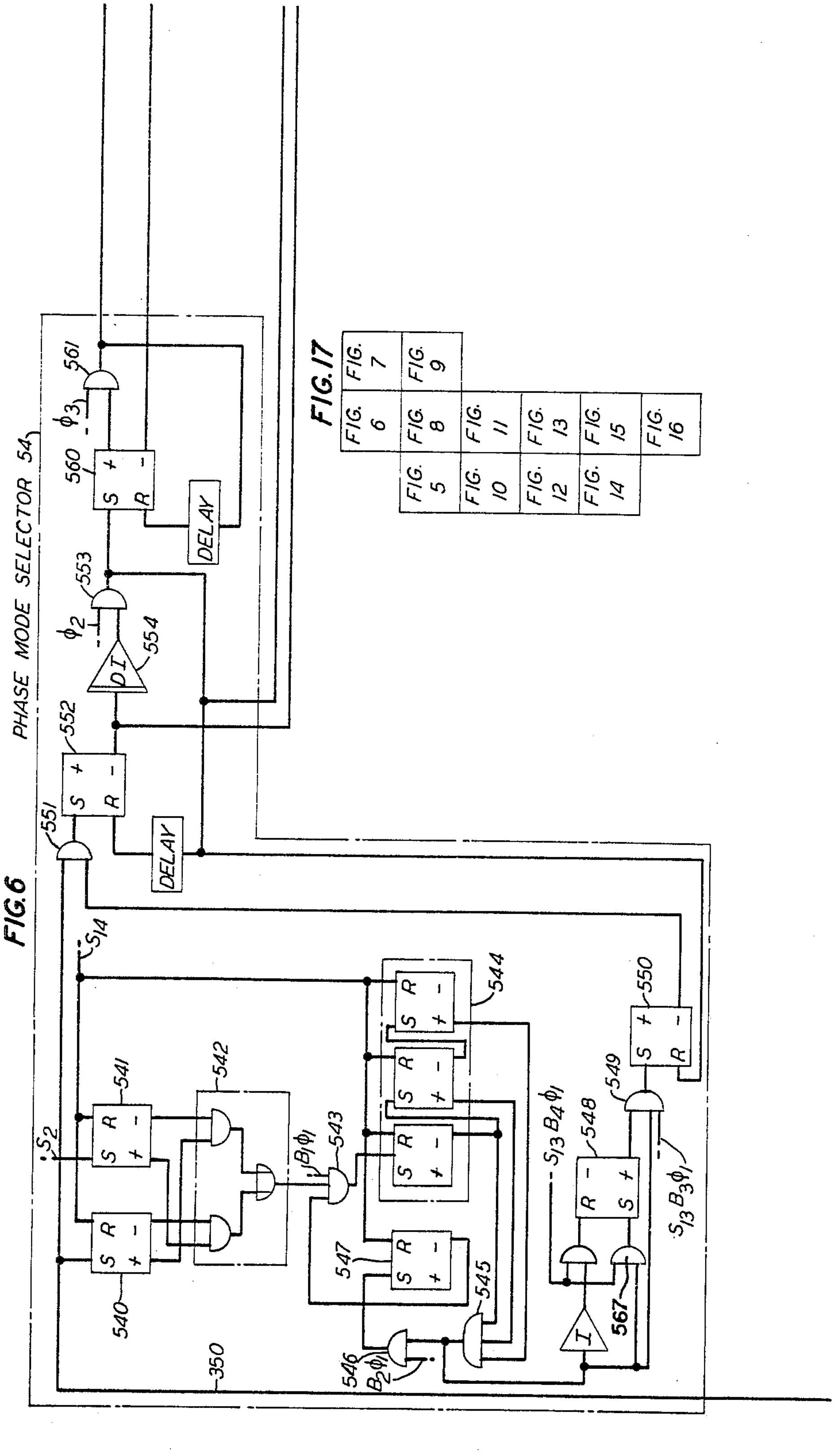

As noted in FIG. 6, the output of frame detector 32, exhibting the phase mode of the first center, is applied to flip-flop 540. This $S_2$ signal normally is received in time $S_1B_8\varphi_2$. Flip-flop 541 receives the $S_2$ timing signal from the local counter 53 in $S_1B_8\varphi_2$. If the system is in synchronism, with each center having the proper phase mode, flip-flops 540 and 541 will be set simultaneously and exclusive OR circuit 542 will fail to produce an output during the interval preceding arrival of an $S_{14}$ reset signal. However, if the local center is out-of-phase, exclusive OR circuit 542 will provide an output signal to enable AND gate 543 during succeeding $B_1\varphi_1$ intervals.

The successive outputs of AND gate 543 will be counted in a three-stage counter 544. In this illustrative embodiment detection of a phase difference of more than ¼ frame between centers is considered to be an indication of the out-of-phase mode. Thus if the binary count reaches six (¼ of the twenty-four time slots), AND gate 545 is enabled, indicating the presence of an out-of-phase mode. The output of AND gate 545 enables AND gate 546 to set flip-flop 547 in the next $B_2\varphi_1$ interval. With flip-flop 547 in the set state, AND gate 543 is disabled, and the condition of counter 544 is maintained. At $S_{13}B_4\varphi_1$ the output of AND gate 545 indicates the suspected occurrence of the out-of-phase mode by setting flip-flop 548 through AND gate 567.

Counter 544 and flip-flop 547 are reset by the $S_{14}$ signal so that AND gate 543 is enabled to detect whether the same condition is present in the following frame. Thus at $S_{13}B_3\varphi_1$ of the following frame the output of AND gate 545 and flip-flop 548 will enable AND gate 549 to set flip-flop 550 if in fact the same out-of-phase mode condition is present in that frame. In this fashion the suspected out-of-phase mode condition detected in the previous frame is verified.

Flip-flop 550 in the set state, together with the output of frame detector 32 on lead 350, sets flip-flop 552 through AND gate 551. This should occur in $S_2$ if the local center is to be re-established in the in-phase mode. For this purpose the next phase $\varphi_2$ pulse allowed to pass through AND gate 553 should occur in $S_2B_1\varphi_2$ within the local center.

Counter 53, FIG. 7, is controlled to provide such a condition by delaying and inverting the normal reset output of flip-flop 552 in delay inverter 554 and by utilizing this delayed output to reset bit counter 530 to the state corresponding to $B_1$ (001) through AND gate 553 and OR gate 555. The normal bit counter drive pulses are inhibited at AND gates 557 and 558 by the output of flip-flop 552. The output of AND gate 553 also sets flip-flop 560, and the following phase $\varphi_3$ pulse enables AND gate 561 to reset time slot counter 535 to the $S_2$ state (00001).

Immediately following the resetting of bit counter 530 and time slot counter 535 to reflect the $S_2B_1$ state, flip-flops 550, 552 and 556 are reset through appropriate delay circuits, and the phase mode selector concludes its operation.

PHASE SYNCHRONIZATION—FIGS. 10–16

The phase synchronization circuit 40 for each center, as noted in FIG. 3, comprises a jitter elimination system including jitter eliminator circuit 41, memory 42 and control 43, and a bit phase synchronization system comprising bit shifter 44, memory 45 and control 46. The detailed configuration of the bit phase synchronization system, as illustrated in FIGS. 11, 13, 15 and 16, will be considered first.

The incoming pulse train is normally received in bit shifter 44 in phase $\varphi_4$ from jitter eliminator 41. As noted in FIG. 11, the input signal is received in the first stage of shift register 440, the length of which is chosen to be twice the expected phase variation between switching centers. An eight bit shift register was chosen for this embodiment. Upon each receipt of a signal from jitter eliminator 41, the contents of shift register 440 are advanced one stage. Adjacent stages of shift register 440 are interconnected by AND gates and delay inverters each having a delay of 150 nanoseconds in this illustrative embodiment.

Figure 10:
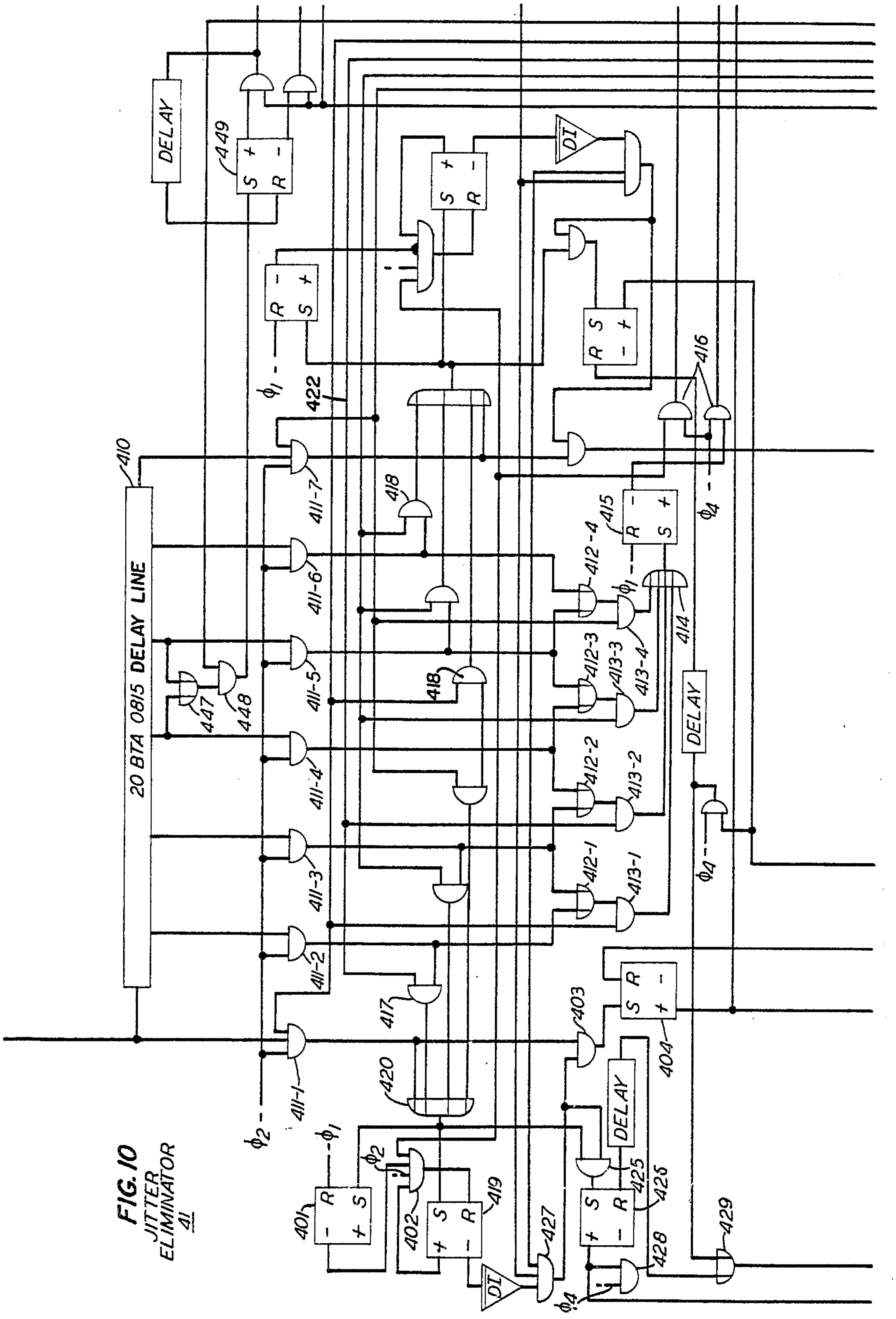
Figure 11:
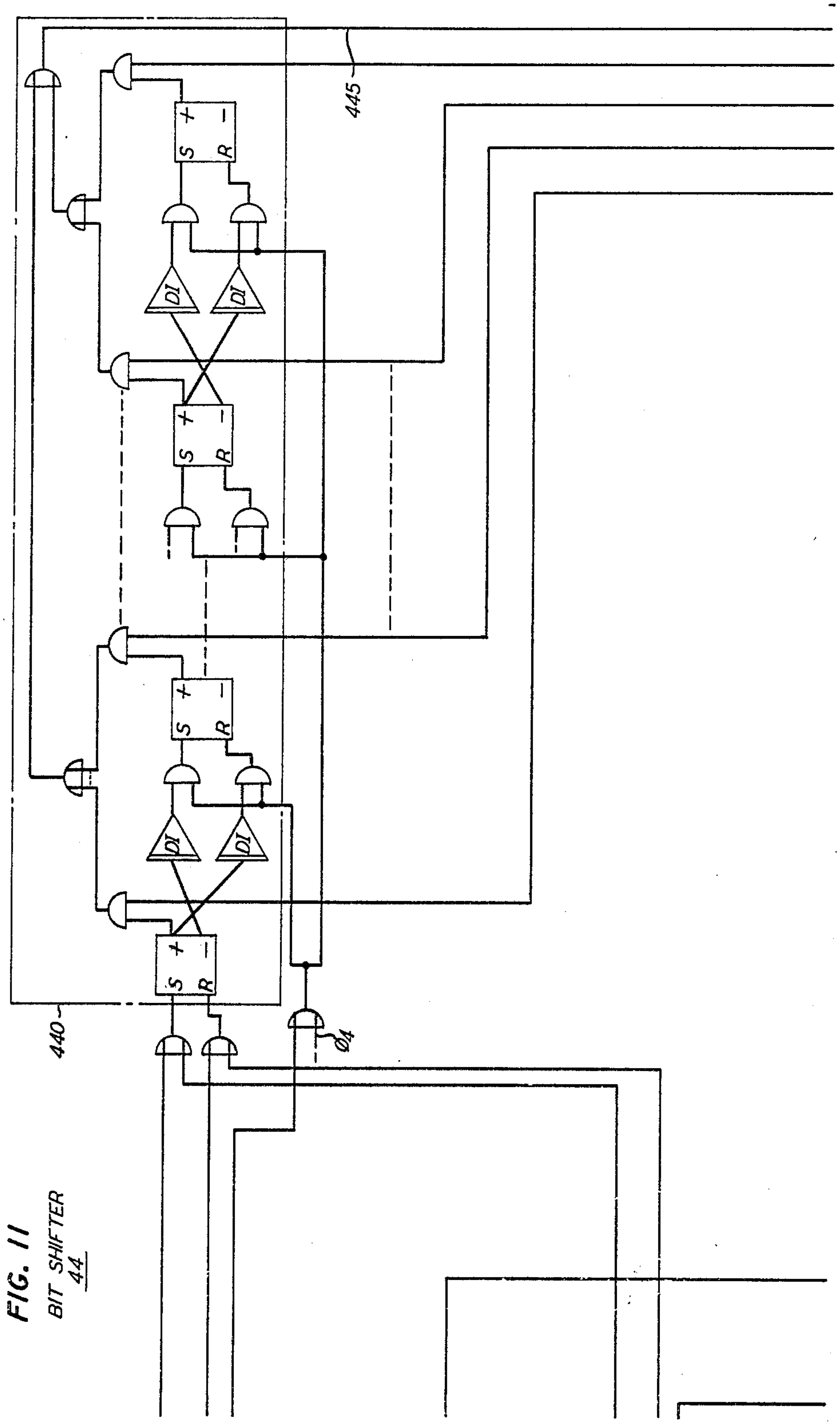
Figure 13:
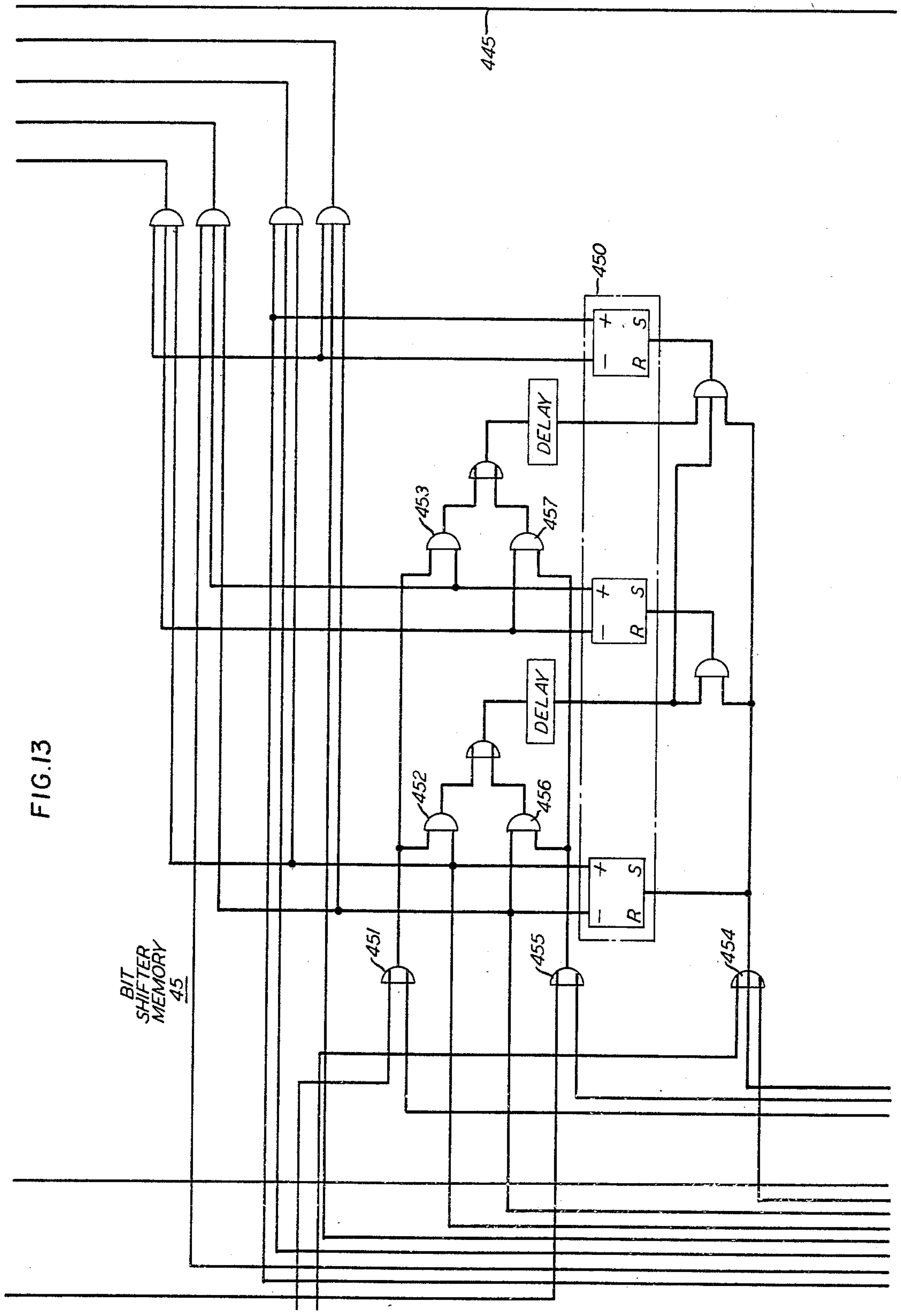
Figure 14:
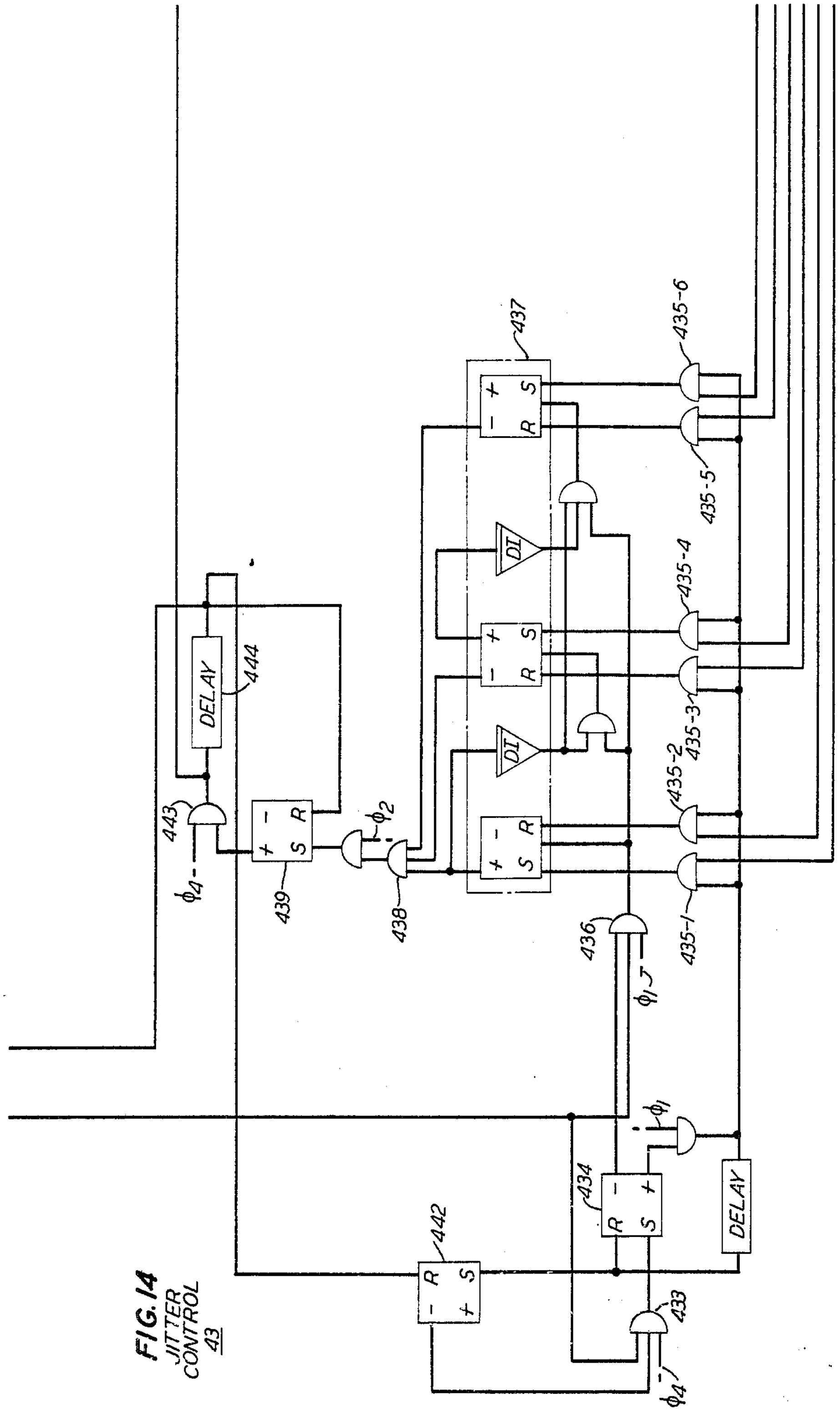

The output AND gates of shift register 440 are controlled by bit shifter memory 45, FIG. 13, in accordance with the detected phase lag or lead of the incoming frame timing pattern. Memory 45, comprising a reversible counter 450 and decoding AND gates, receives its control signals from bit shifter memory control 46, FIGS. 15 and 16, jitter eliminator 41, FIG. 10, and jitter control 43, FIG. 14. The up signal received at OR gate 451, FIG. 13, enables AND gates 452 and 453, and counter 450 records the pulses received through OR gate 454 in ascending order. A down signal received at OR gate 455 will enable AND gates 456 and 457, and counter 450 will record the number of pulses received through OR gate 454 in descending order. As counter 450 is incremented by phase $\varphi_4$ signals and bit shifter register 440 is advanced by phase $\varphi_2$ or $\varphi_4$ signals, the output pulse from bit shifter 44 appearing on lead 445 is generated in phase $\varphi_3$.

Figure 15:
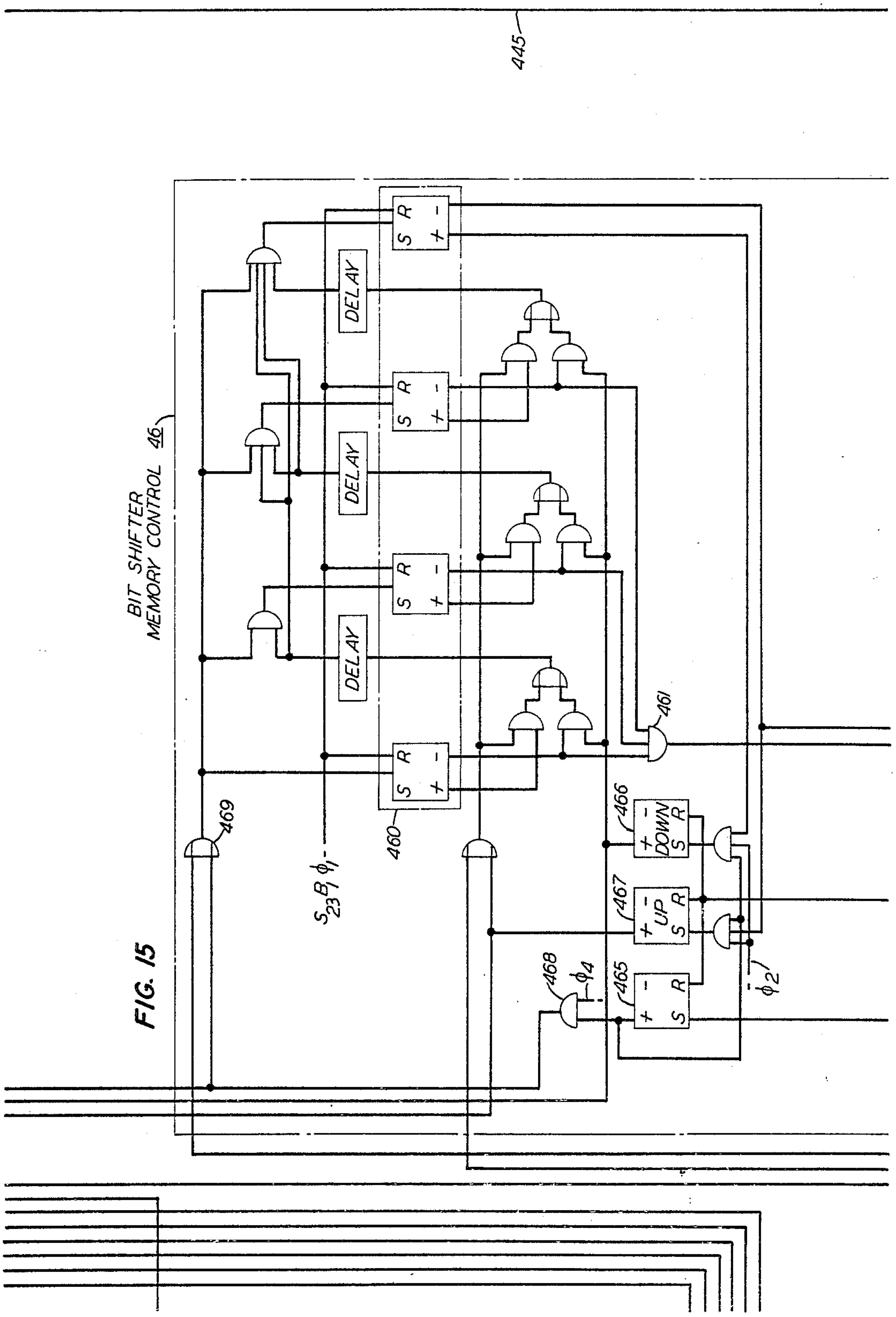
Figure 16:
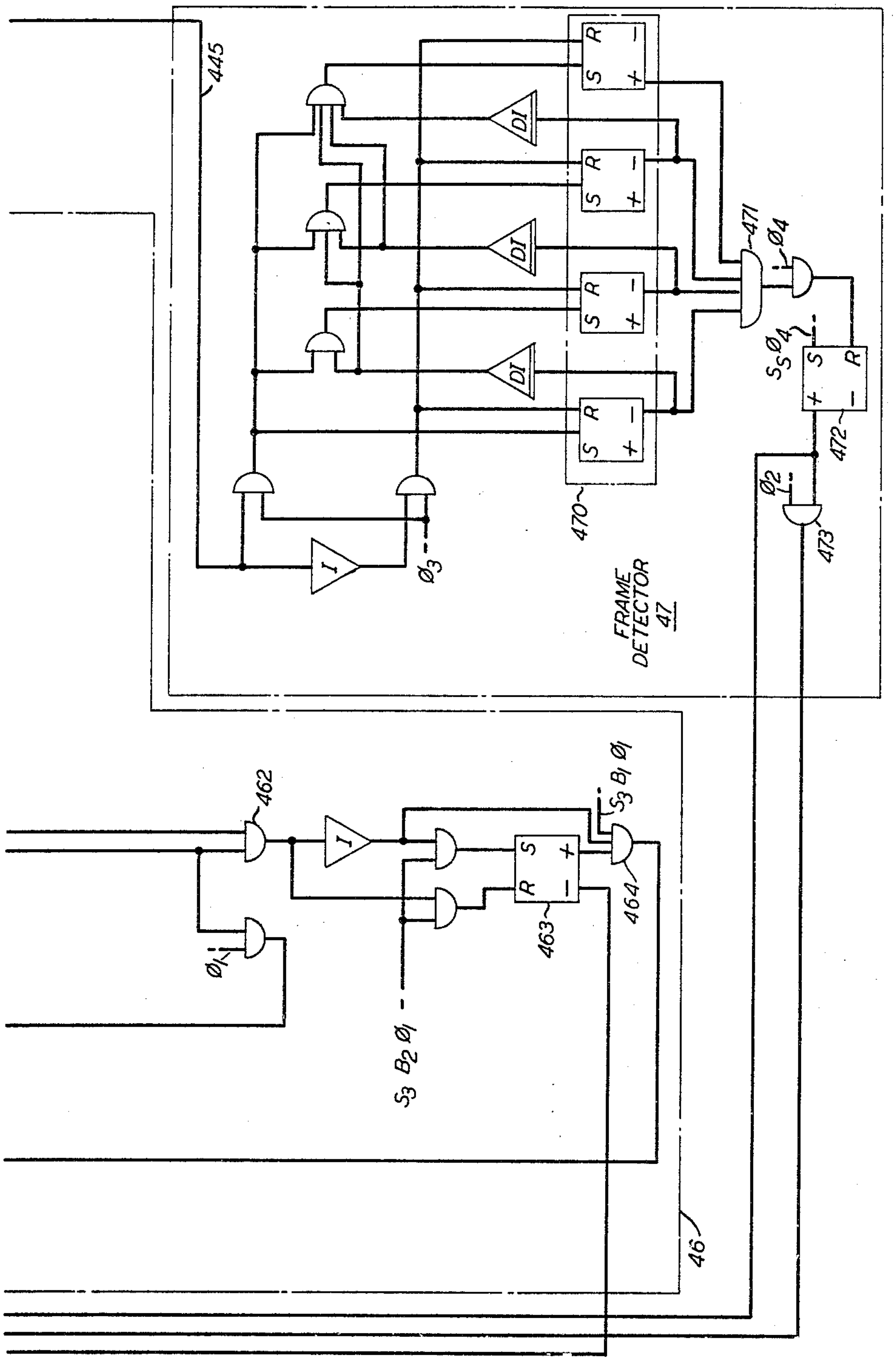

FIGS. 15 and 16 illustrate the configuration of bit shifter memory control 46 and frame dector 47. The output of bit shifter 44 is received in frame detector 47 over lead 445 in phase $\varphi_3$. Detector 47 comprises a four-stage counter 470 which is reset whenever a "0" appears in the incoming signal pulse train. Thus in normal operation AND gate 471 at the output of counter 470 will be enabled upon receipt of eight successive "1's" representing the frame pattern in the incoming pulse train, and the instant at which an output signal is provided by AND gate 471 is designated $S_1B_8\varphi_3$. This output signal serves to reset flip-flop 472 which in turn is set at $S_8\varphi_4$.

In the normal case, with bit shifter 44 in phase with the clock pulse generated locally, flip-flop 472 is set for an eight bit interval beginning with $S_8\varphi_4$ and ending at $S_1B_8\varphi_4$. The actual duration of the flip-flop 472 output signal is measured by applying $\varphi_2$ pulses to AND gate 473 and counting the AND gate 473 outputs in counter 460, FIG. 15, of bit shifter memory control 46.

The purpose of control 46 is to generate pulses to change the state of bit shifter memory 45 if the wrong count is received from frame detector 47, thereby correcting the phase of the frame pattern pulses. Thus if eight pulses are counted in counter 460, the output through AND gate 461 enables AND gate 462 to reset flip-flop 463 at $S_3B_2\varphi_1$. This is regarded as the normal condition. If the count is anything other than eight, AND gate 462 will not be enabled and flip-flop 463 will be set in $S_3B_2\varphi_1$. If this error conditon persists in two successive frames, flip-flop 465 will be set by the output of AND gate 464 and the error conditon verified.

If the most significant digit in counter 460 of control circuit 46 is a "1," indicating a count greater than eight or excessive delay of the incoming pulse train, the number registered in memory 45 will be reduced by the difference between eight and the number registered in counter 460. For this purpose flip-flop 466 is set in phase $\varphi_2$ by the set outputs of flip-flop 465 and the most significant digit stage of counter 460, and counter 460 is prepared to count down. Phase $\varphi_4$ pulses are now received by counter 460 through AND gate 468 and OR gate 469, the count continuing until state "8" or 0001 is reached. This state is detected by AND gates 461 and 462, serving to reset flip-flop 463. The same $\varphi_4$ pulses are transmitted to counter 450 in memory 45 to revise its state correspondingly.

If the most significant digit in counter 460 of control 46 is "0," the number contained in memory 45 should be increased by the difference between eight and the number contained in counter 460. In this instance flip-flop 467 is set to permit counters 450 and 460 to operate as up counters. The $\varphi_4$ pulses are now transmitted through AND gate 468 to counters 450 and 460 until the state "8" is reached.

Flip-flops 465, 466 and 467 are reset by the output of AND gate 461 when the count of eight is reached in counter 460, and flip-flop 463 is reset upon verification in the next frame that phase synchronization has been recovered. Counter 460 is reset at $S_{23}B_1\varphi_1$, and the normal phase synchronization procedure is resumed in the next frame.

JITTER ELIMINATION—FIGS. 10, 12, 14

The bit phase synchronization arrangement described in the preceding section compensates for phase differences which exceed one bit width. However, if the phase difference is less than one bit width, termed "jitter," additional circuitry is required to eliminate the jitter before the incoming signals are applied to the bit phase synchronization arrangement. As noted in FIG. 10, the jitter elimination circuit 41 comprises, in accordance with this illustrative embodiment, an electromagnetic tapped delay line 410 which is controlled by memory 42, FIG. 12, through a series of logic gates. Finally, jitter control 43, FIG. 14, instructs the bit phase synchronization circuit whenever the jitter exceeds the range covered by the jitter elimination circuit.

As indicated heretofore, the incoming signal pulse train is transmitted in a return to "0" waveform occupying phases $\varphi_2$ and $\varphi_3$. Each pulse is received in tapped delay line 410 which is designed to provide six distinct 160 nanosecond intervals, each interval corresponding to one phase width. Thus a pulse moving through the delay line will always straddle two adjacent output taps.

The content of delay line 410 is retrieved in phase $\varphi_2$ through a series of AND gates 411–1 through 7. If the pulse is properly positioned the output from delay line 410 will be received by a pair of intermediate tap gates 411–2 through 6. The jitter eliminator memory 42 maintains a record of this output position and compares it with each successive delay line output. A phase lag or lead will cause a pulse to appear in the delay line earlier or later than expected. Comparison of the output position with that recorded in memory 42 will reveal this discrepancy and the output signal will be accepted from the appropriate one of the pair of output gates, which will compensate for the error.

Since a phase lag or lead from a pair of taps including one of the end taps may not be detected, memory 42 does not record the end taps as a suitable output position. Instead the arrangement is such that a pulse detected at an end tap will result in readout from a different position in the delay line. For example, if an incoming signal pulse is detected at gates 411–1 and 2, the arrangement is such that the pulse will actually be retrieved through gates 411–5 and 6. Similarly, if the pulse arrives early and is detected at gate 411–7, retrieval will be effected at gates 411–2 and 3. Since successive pulses are two phases, or two tap gates apart, all of the necessary transfer operations to overcome jitter can be accomplished with a delay line having seven taps.

The operations required to realize this jitter adjustment in the tapped delay line will now be considered. If the incoming pulse is properly positioned, an output will be read from one of the pairs of intermediate taps, thereby enabling one of the intermediate gate pairs 411–2 and 411–3, 411–3, and 411–4, 411–4 and 411–5, or 411–5 and 411–6. These outputs are termed modes I, II, III and IV, respectively, and are stored in memory 42. The operation mode of the jitter eliminator, as stored in memory 42, is indicated to the jitter eliminator through AND gates 421–1 through 421–4.

Each adjacent pair of intermediate outputs of delay line 410 is transmitted in phase $\varphi_2$ through one of the OR gates 412–1 through 412–4 and read out in the corresponding mode through AND gates 413–1 through 413–4 to set flip-flop 415 through OR gate 414. This will occur at approximately phase $\varphi_3$ due to the delays caused in the logic circuitry. The output of flip-flop 415 enables one of the AND gates 416 in phase $\varphi_4$ and the bit shifter 44 receives the input signal in the corresponding mode.

In order to change the information stored in memory 42, which consists of a reversible counter similar to bit shifter memory 45, signals are provided by jitter eliminator 41 to increment the counter in the proper direction as determined by the phase lead or lag indicated by the jitter encountered in the incoming signal. Thus consider, for example, that jitter eliminator 41 is operating in mode II such that the output of memory 42 appears on lead 422 from AND gate 421–2. A normal input signal will be taken from AND gates 411–3 and 411–4 at phase 2. These outputs in turn will enable AND gate 413–2 through OR gate 412–2 in conjunction with the mode II input on lead 422, and bit shifter 44 will be notified accordingly.

In mode II the outputs of tap gates 411–2 and 411–5 on opposite sides of the normal mode II output gates, are observed at AND gates 417 and 418, respectively. If AND gate 417 is enabled, for example, it indicates that jitter has caused a delay in the receipt of the input signal so that gates 411–2 and 411–3 are enabled instead of gates 411–3 and 411–4. The output pulse still arrives in bit shifter 44 at the proper time so long as output gate 411–3 is enabled.

The system arrangement is such that two successive occurrences of this delay condition alter the operation mode from II to I. Thus the output of AND gate 417 sets flip-flop 419 through OR gate 420. The succeeding input signal subject to the same jitter condition again enables AND gate 417 which this time serves to set flip-flop 426 through OR gate 420 and AND gate 425 in conjunction with the output of AND gate 427. Flip-flop 426 in turn enables AND gate 428 at phase $\varphi_4$ to provide a signal through OR gate 429 to flip-flop 430 and AND gate 431 in memory 42. Concurrently the set output of flip-flop 426 is transmitted to AND gate 432 in memory 42. These two signals arriving in memory 42, which was previously storing mode II, will act to revise the storage to indicate mode I.

If the next incoming pulse following detection of jitter is a "1" and is free of jitter, OR gate 420 will fail to provide an output signal so that flip-flop 401 will not be set. This results in AND gate 402 being enabled to reset flip-flop 419 in the following phast $\varphi_4$. Thus memory mode I is maintained. However, if the next incoming pulse should be a "0," it would be impossible to detect the presencse of jitter, in which instance the foregoing operation should not be permitted. For this purpose flip-flop 401 is reset upon receipt of the next phase $\varphi_1$ pulse and cannot be set during receipt of the "0" input signal. Thus AND gate 402 will not be enabled so long as a "0" input signal is present.

If the jitter eliminator is operating in modes I, II and III and jitter causes the input signal to be received prematurely, or if the jitter eliminator is operating in modes II, III and IV and jitter causes the late arrival of the input signal, similar mode transfers are performed.

The procedure is distinct for those instances in which the input signal is detected at the extreme taps of delay line 410. For example, if a pulse is detected at tap gate 411–1 while the jitter eliminator is in mode I, flip-flop 419 is set in phase $\varphi_2$ through OR gate 420. The succeding "1" input signal detected at tap gate 411–1 in turn sets flip-flop 426 through AND gates 427 and 425. The set output of flip-flop 426 is received at AND gate 432 as well as flip-flop 430 and AND gate 431 of memory 42, these inputs serving to alter the state of memory 42 from mode I to mode IV.

Up to this point the operation parallels that for jitter correction as previously described. It may be noted, however, that if the normal routine is followed in this instance, bit shifter 44 would record the bit retrieved from tap gate 411–1 of delay line 410, after which the mode is changed from I to IV. The same bit now advanced four positions in delay line 410 will again be retrieved in the next bit interval, this time from tap gate 411–5 or 411–6, and is recorded in bit shifter 44 in the next bit position. Thus a special operation must be performed to prevent a double retrieval of the same bit from bit shifter 44. In this instance the circuit is arranged to retrieve the first recording from a predetermined position and then when the second recording reaches the predetermined position the output is taken from the preceding position. If, for example, the bit shifter output is taken from the third stage and the two recordings of the same bit occupy successive stages, the first recorded bit will be retrieved from the third position while jitter eliminator 41 is operating in mode I. Two bit intervals following the change to mode IV, when the second recording appears in the third position, the output will be taken from the second position, thereby skipping over the second recording of the same bit. It may be stated as a generalization of the foregoing that if the output is taken from the $k$ stage of bit shifter 44, the $k-1$ output after the mode change will be taken from the $k-1$ stage.

Jitter compensation control 43 performs this function, and flip-flop 404 in the jitter eliminator directs the operation. The usual memory modification signals are transmitted to memory 42 from flip-flop 426. However, in this case flip-flop 404 is set at the same time that flip-flop 426 is set. The set output of flip-flop 404 is transmitted to bit shifter memory 45, FIG. 13, and jitter compensation control 43, FIG. 14. In control circuit 43 this signal enables AND gate 433 at phase $\varphi_4$ to set flip-flop 434. At the next phase $\varphi_1$ AND gates 435—1 through 435—6 are enabled, and the content of bit shifter memory 45 is transferred to counter 437 of jitter compensation control 43. Flip-flop 434 is reset and flip-flop 442 is set following this storage operation. This in turn disables AND gate 433 so that further transfers from bit shifter memory 42 are inhibited.

Counter 437 is a down counter receiving phase $\varphi_1$ pulses through AND gate 436 which is enabled by flip-flop 434 in the reset state. When counter 437 reaches state 001, gate 438 is enabled and its output sets flip-flop 439 at phase $\varphi_2$. The following phase $\varphi_4$ signal, together with the set output of flip-flop 439, enables AND gate 443 to signal bit shifter memory 45. This count signal serves to alter the content of bit shifter memory 45 in conjunction wi.h the down signal at the set output of flip-flop 404 in jitter eliminator 41. The count pulse is delayed in circuit 444 and then utilized to reset flip-flop 404 in jitter eliminator 41.

Another departure is noted for the case in which an output signal appears at tap gate 411–7 at one end of delay line 410 with jitter eliminator 41 operating in mode IV. Under these conditions the operation will change from mode IV to mode I in the manner previously described, but in this case a signal bit will be lost in transit unless special precautions are taken. These include the application of the signal pulse retrieved from delay line 410 to bit shifter 44 in phase $\varphi_2$ rather than the normal application in phase $\varphi_4$. Thus the output of gate 411–7 is instrumental in setting flip-flop 446, FIG. 12, which, in addition to altering bit shifter memory 65, performs a special retrieval from positions 4 and 5 of delay line 410 through OR gate 447 and AND gate 448. The output of AND gate 448 sets flip-flop 449, the condition of which defines the input signal which in this instance is applied to the input of bit shifter 44 in phase $\varphi_2$ rather than the normal phase $\varphi_4$.

Figure 12:
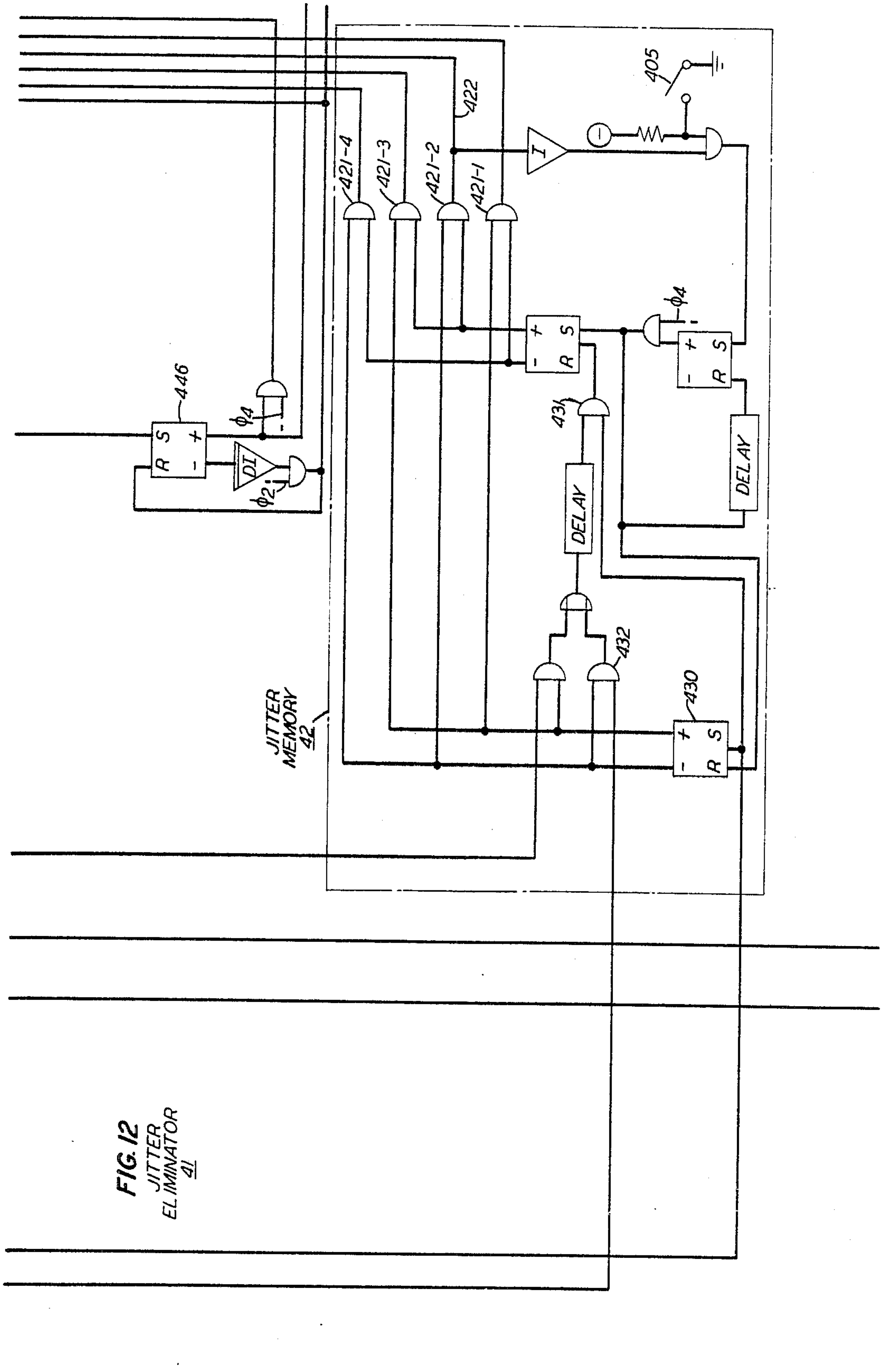

In order to initiate system operation, start switch 405, FIG. 12, is utilized to set the mode of jitter eliminator memory 42 to mode II.

It is to be understood that the above-described arrangement is illustrative of the application of the principles of the invention. Numerous other arrangements may be devised by those skilled in the art without departing from the spirit and scope of the invention.

What is claimed is:

1. In a time division multiplex communication system comprising a plurality of control centers each having a local oscillator, means at each center for establishing ard maintaining synchronism of the centers with respect to each other comprising means for counting down the output of the oscillator at the local center to define a sequence of time slots in repetitive frame intervals, means for transmitting a unique signal from said local center to each of the other centers in a time slot assigned to synchronization in each frame, means for detecting the unique signal received from each of the other centers, means for comparing the phase of each detecting means output individually with the phase of said synchronization time slot defined by said countdown means and means for utilizing the sum of the error signals produced by said phase comparing means to adjust the frequency of said local center oscillator output.

2. In a communication system comprising a plurality of interconnected control centers, means at each center for establishing and maintaining synchronism among all of the centers comprising means for defining a sequence of time slots in repetitive frame intervals, means for transmitting a framing signal to each of the other centers in a time slot reserved for synchronization in each frame, and means for synchronizing the system frequency comprising means for detecting the framing signal received from each of the other centers, means for comparing the phase of the output signal from each of said detecting means individually with the phase of the locally generated framing signal and means for utilizing the error signals produced by said phase comparing means to adjust the frequency of signals generated by said time slot defining means.

3. In the communication system in accordance with claim 2, the combination further comprising means for comparing the phase mode of the output signal from one of said framing signal detecting means with the phase mode of said time slot defining means and means for utilizing the error signal produced by said phase mode comparing means to adjust the phase mode of said time slot defining means.

4. In the communication system in accordance with claim 2, wherein said time slot defining means comprises means for defining a plurality of digit intervals in each time slot, said framing signal comprising a sequence of like polarity pulses in said digit intervals of said time slot reserved for synchronization, the combination further comprising means for correcting the phase of signals received from a remote center comprising means for adjusting the phase of the digit pulses in the framing signal received from said remote center to match the phase of the digit pulses in the locally generated framing signal and means for applying the resultant phase corrected pulses to a switching network in the local center.

5. In the communication system in accordance with claim 4, the combination wherein said phase correcting means further comprises means connected between the input from said remote center and said phase adjusting means to compensate for phase shifts of less than one bit interval in each incoming digit pulse.

6. In the communication system in accordance with claim 4, the combination wherein said frequency synchronizing means comprises means for reshaping and repositioning each signal pulse received from said remote center, and means for utilizing said reshaped and repositioned signal pulses to gate said signal pulses to said framing signal detecting means.

7. In a communication system comprising a plurality of interconnected control centers, apparatus at each center for establishing and maintaining synchronism among all of the centers comprising counting circuitry for defining a sequence of time slots in repetitive frame intervals, apparatus for transmitting a framing signal to each of the other centers in a time slot reserved for synchronization in each frame, and a circuit arrangement for synchronizing the system frequency comprising circuits for detecting the framing signal received from each of the other centers and circuits for comparing the phase of each detecting circuit output individually with the phase of the locally generated framing signal, characterized in that the sum of the error signals produced by the phase comparing circuits is utilized to adjust the frequency of signals generated by said counting circuitry.

8. The combination in the communication system in accordance with claim 7, characterized in that a circuit compares the phase mode of the output signal from one of said framing signal detecting circuits with the phase mode of said counting circuitry and apparatus utilizes the error signal produced by said phase mode comparing circuit to adjust the phase mode of said counting circuitry.

9. The combination in the communication system in accordance with claim 7, wherein said counting circuitry comprises means for defining a plurality of digit intervals in each time slot, said framing signal comprising a sequence of like polarity pulses in said digit intervals of said time slot reserved for synchronization, characterized in that apparatus adjusts the phase of the digit pulses in the framing signal received from a remote center to match the phase of the digit pulses in the locally generated framing signal, and apparatus applies the resultant phase corrected pulses to a switching network in the local center.

10. The combination in the communication system in accordance with claim 9, characterized in that apparatus connected between the input from said remote center and said phase adjusting apparatus compensates for phase shifts of less than one bit interval in each incoming digit pulse.

11. The combination in the communication system in accordance with claim 9, characterized in that each signal pulse received from said remote center is reshaped and repositioned in said frequency synchronizing circuit arrangement, and the reshaped and repositioned signal pulses are utilized to gate said signal pulses to said framing signal detecting circuit.

References Cited

UNITED STATES PATENTS

| | | | |
|---|---|---|---|
| 3,050,586 | 8/1962 | Runyon | 179—15 |
| 3,306,978 | 8/1967 | Simmons et al. | 179—15 |
| 3,377,585 | 4/1968 | Magnin | 179—15 |

KATHLEEN H. CLAFFY, Primary Examiner

ALBERT B. KIMBALL, Jr., Assistant Examiner

U.S. Cl. X.R.

179—18